US012766529B2

(12) United States Patent
Boatman

(10) Patent No.: US 12,766,529 B2
(45) Date of Patent: Oct. 20, 2026

(54) FLUID INJECTION HOLLOW CONE SPRAY NOZZLE ASSEMBLY

(71) Applicant: Spraying Systems Co., Wheaton, IL (US)

(72) Inventor: Digna Boatman, Plainfield, IL (US)

(73) Assignee: Spraying Systems Co., Wheaton, IL (US)

( * ) Notice: Subject to any disclaimer, the term of this patent is extended or adjusted under 35 U.S.C. 154(b) by 203 days.

(21) Appl. No.: 18/536,726

(22) Filed: Dec. 12, 2023

(65) Prior Publication Data

US 2024/0189835 A1 Jun. 13, 2024

Related U.S. Application Data

(60) Provisional application No. 63/431,970, filed on Dec. 12, 2022.

(51) Int. Cl.
*B05B 1/26* (2006.01)
*B05B 1/04* (2006.01)

(52) U.S. Cl.
CPC ................ *B05B 1/262* (2013.01); *B05B 1/04* (2013.01); *B05B 1/042* (2013.01); *B05B 1/044* (2013.01); *B05B 1/26* (2013.01); *B05B 1/267* (2013.01)

(58) Field of Classification Search
None
See application file for complete search history.

(56) References Cited

U.S. PATENT DOCUMENTS

| | | | | |
|---|---|---|---|---|
| 1,758,119 | A | 5/1930 | Le Moon | |
| 4,607,794 | A * | 8/1986 | Horwood | B05B 1/042 239/455 |
| 6,182,767 | B1 | 2/2001 | Jackson | |
| 2020/0023215 | A1 | 1/2020 | Feenstra et al. | |

FOREIGN PATENT DOCUMENTS

| | | | |
|---|---|---|---|
| EP | 3381566 | A1 | 10/2018 |

OTHER PUBLICATIONS

International Bureau, International Search Report in International Application No. PCT/US2023/083530, mailed Mar. 20, 2024.

* cited by examiner

*Primary Examiner* — Lorne E Meade
*Assistant Examiner* — Alyson Joan Harrington
(74) *Attorney, Agent, or Firm* — Leydig, Voit & Mayer, Ltd.

(57) ABSTRACT

A spray nozzle assembly includes a nozzle cap body and a deflector cap. The nozzle cap body having a fluid passage extending there through. The downstream end of the fluid passage being defined by an end wall having a discharge orifice. The end wall defines an exterior end surface of the cap body. A deflector cap is arranged at a downstream end of the cap body. The deflector cap has an upstream end defining a deflector surface spaced from the exterior end surface of the nozzle body in a longitudinal direction of the spray nozzle assembly and opposing the discharge orifice. The exterior end surface of the cap body and the deflector surface define a radially outwardly extending, annular discharge passage communicating with the discharge orifice and that together with the discharge orifice produces a full hollow cone spray discharge pattern.

13 Claims, 13 Drawing Sheets

FLUID INJECTION HOLLOW CONE SPRAY NOZZLE ASSEMBLY

BACKGROUND OF THE INVENTION

One application for spray nozzles involves injecting fluid into a fluid environment. The fluid environment may comprise the same fluid being injected by the spray nozzles or a different fluid. In some such applications, the spray nozzles are submerged in the fluid environment. Spray nozzle design for these submerged nozzle applications presents a number of challenges. For example, when injecting fluid using a submerged spray nozzle, achieving and maintaining the desired spray pattern and atomization can require a considerable amount of energy. Moreover, the injection of fluid via the submerged spray nozzle induces flow effects in the fluid environment. These flow effects are dependent on, among other things, the spray nozzle geometry. It is generally preferable that these flow effects, which, for example, can be used to help mixing of the fluid, result in substantially homogenous flow conditions in the fluid environment. However, achieving such homogenous flow conditions with a conventional spray nozzle design can be difficult. Moreover, the design issues with the fluid injection spray nozzles can be further complicated if solid particles are present in the fluid environment.

OBJECTS OF THE INVENTION

In view of the foregoing, a general object of the present invention is to provide a spray nozzle assembly that can be submerged in a fluid environment and used to inject a fluid into the fluid medium.

A further object of the present invention is to provide a spray nozzle assembly of the foregoing type that has reduced energy consumption.

Another object of the present invention is to provide a spray nozzle assembly of the foregoing type that can induce homogenous flow conditions in the fluid medium.

A further object of the present invention is to provide a spray nozzle assembly of the foregoing type that can be used in fluid environments that contain solid particles.

Other objects and advantages of the invention will become apparent upon reading the following detailed description and upon reference to the drawings. The identified objects are not intended to limit the present invention.

DETAILED DESCRIPTION OF THE INVENTION

Referring to FIGS. 1-4 of the drawings, there is shown an exemplary embodiment of a spray nozzle assembly 10 according to the present invention. The spray nozzle assembly 10 of FIGS. 1-4 is specifically configured for use in injecting fluid into a fluid medium while being submerged in that fluid medium. The fluid being injected by the spray nozzle assembly 10 may be the same as or different than the fluid medium. In some embodiments, the fluid being injected may have the same or a similar density as the fluid medium. However, the spray nozzle assembly 10 of the present invention is not limited to applications in which the fluids have the same or similar densities.

Figure 5:
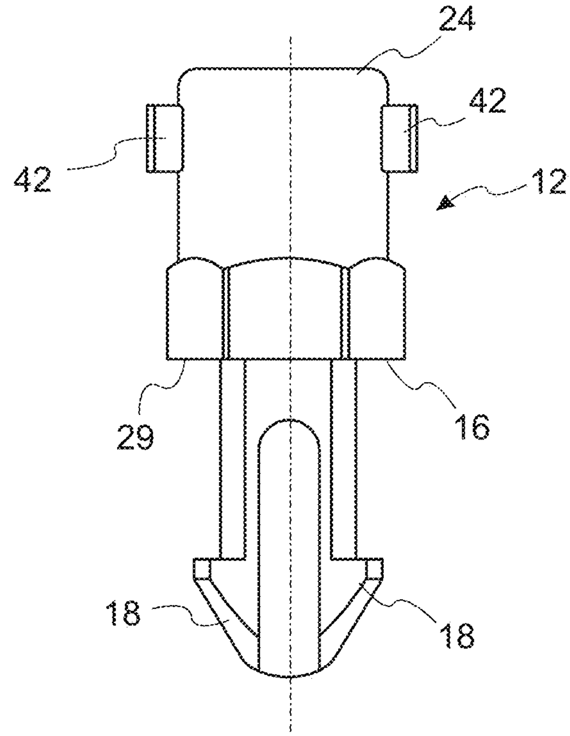
FIG. 5 is a side elevation view of the nozzle body of the spray nozzle assembly of FIG. 1.
Figure 6:
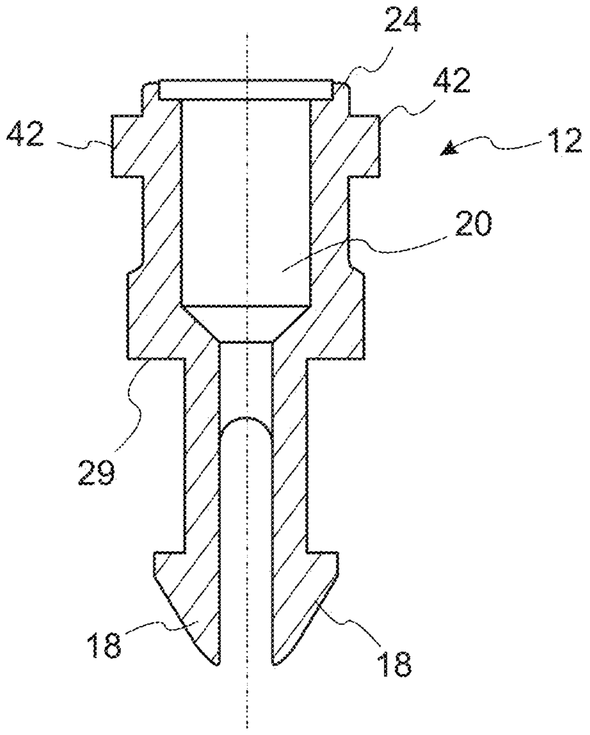
FIG. 6 is a side sectional view of the nozzle body of FIG. 5.

In the illustrated embodiment, the spray nozzle assembly 10 generally includes a nozzle body 12 and a nozzle cap subassembly 14. The nozzle body 12 defines the upstream end of the spray nozzle assembly 10, which is adapted for fluid communication with a fluid supply. As used herein, in normal operation of the spray nozzle assembly 10, fluid flows from the upstream direction and towards the downstream direction, i.e., from upstream to downstream. A upstream fluid inlet end 16 of the nozzle body 12, in this case, is configured with a pair of deflectable legs 18 (see, e.g., FIG. 5) for facilitating connection to a conduit or other structure that communicates with a fluid supply. To direct fluid from the fluid supply conduit to the nozzle cap sub-assembly 14, the nozzle body 12 defines a first fluid passageway 20 (see, e.g., FIG. 6) that extends from the upstream, fluid inlet end 16 of the nozzle body 12 through which fluid enters the spray nozzle assembly 10 to a downstream fluid outlet end 24 of the nozzle body 12 which communicates with the nozzle cap sub-assembly 14 (see FIG. 3) as described in greater detail below. According to one embodiment, the nozzle body 12 is made of plastic, such as, for example, polypropylene. However, the nozzle body 12 can be made of any suitable material including, for example, metal.

To help prevent backwards flow of fluid (such as the fluid medium in which the spray nozzle assembly is submerged) through the nozzle body 12, a check valve 26 may be provided in the first fluid passageway 20 as shown in FIG.

3. The check valve 26 may be movable between an open position in which fluid can flow through the first fluid passageway 20 in the nozzle body 12 and a closed position in which fluid flow through the nozzle body 12 is blocked. The check valve 26 may be further configured such that the check valve 26 is in the open position during normal operation of the spray nozzle assembly 10 and in the closed position when the pressure in the spray nozzle assembly 10 is reduced. In the illustrated embodiment, the check valve 26 has an integrated strainer that helps capture particulates and other contaminants and helps prevents clogging of the spray nozzle assembly 10. A check valve and/or strainer may not be needed in all applications and thus should be considered as optional.

Figure 4:
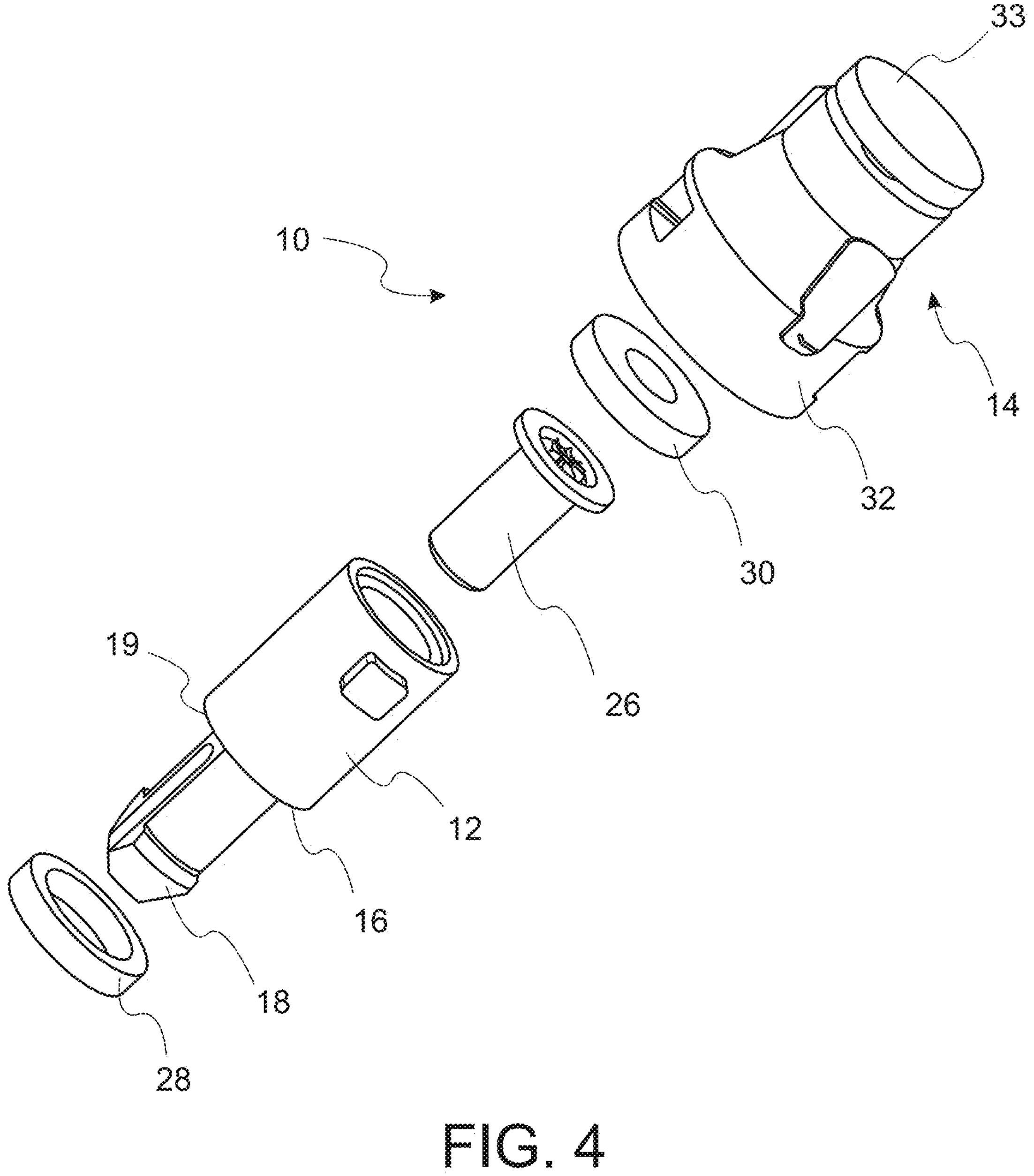
FIG. 4 is an exploded perspective view of the spray nozzle assembly of FIG. 1.

To help provide a tight sealing connection to a fluid supply conduit, a first gasket 28 may be provided adjacent an annular shoulder 29 formed in the exterior surface of the nozzle body 12 at the location where the deflectable legs 18 connect to the remainder of the nozzle body as shown in FIG. 4. Similarly, a second gasket 30 also shown in FIG. 4 is arranged between the downstream end of the nozzle body 12 and an upstream end of the nozzle cap sub-assembly 14 to help seal the connection therebetween. Again, gaskets may not be needed in all implementations of the spray nozzle assembly 10 and should be considered as optional.

Figure 1:
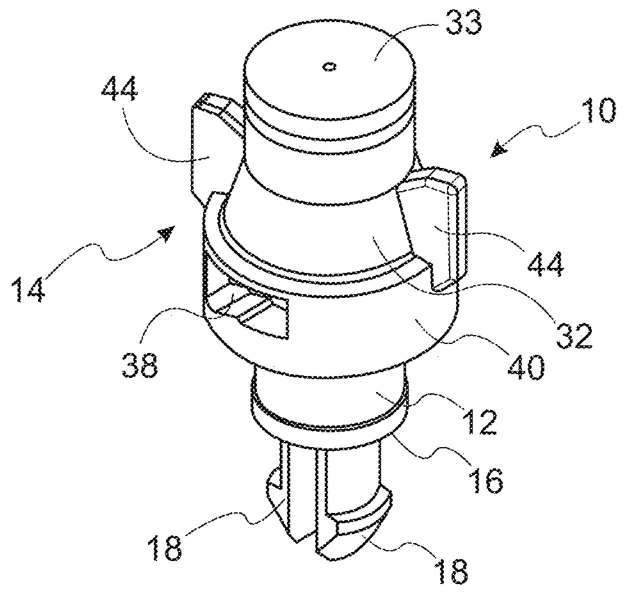
FIG. 1 is a top perspective view of an exemplary embodiment of a spray nozzle assembly according to the present invention.
Figure 2:
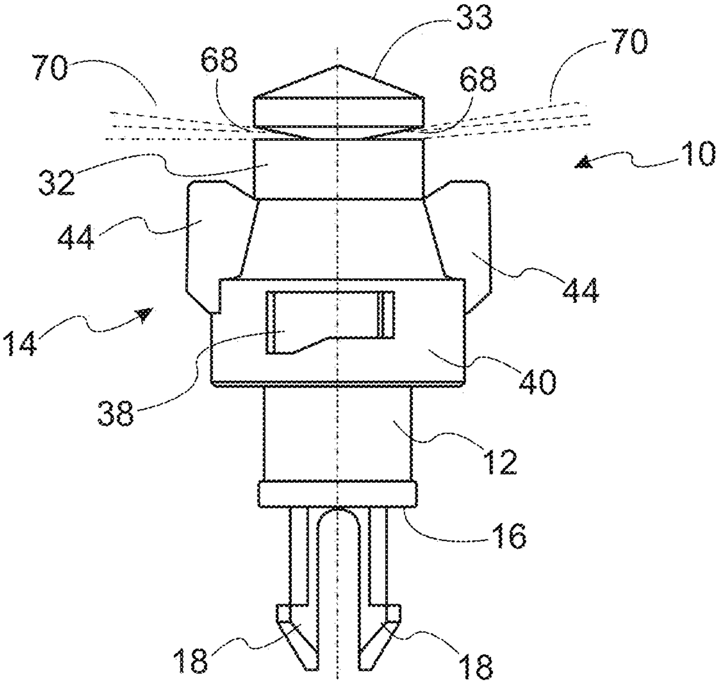
FIG. 2 is a side elevation view of the spray nozzle assembly of FIG. 1.
Figure 3:
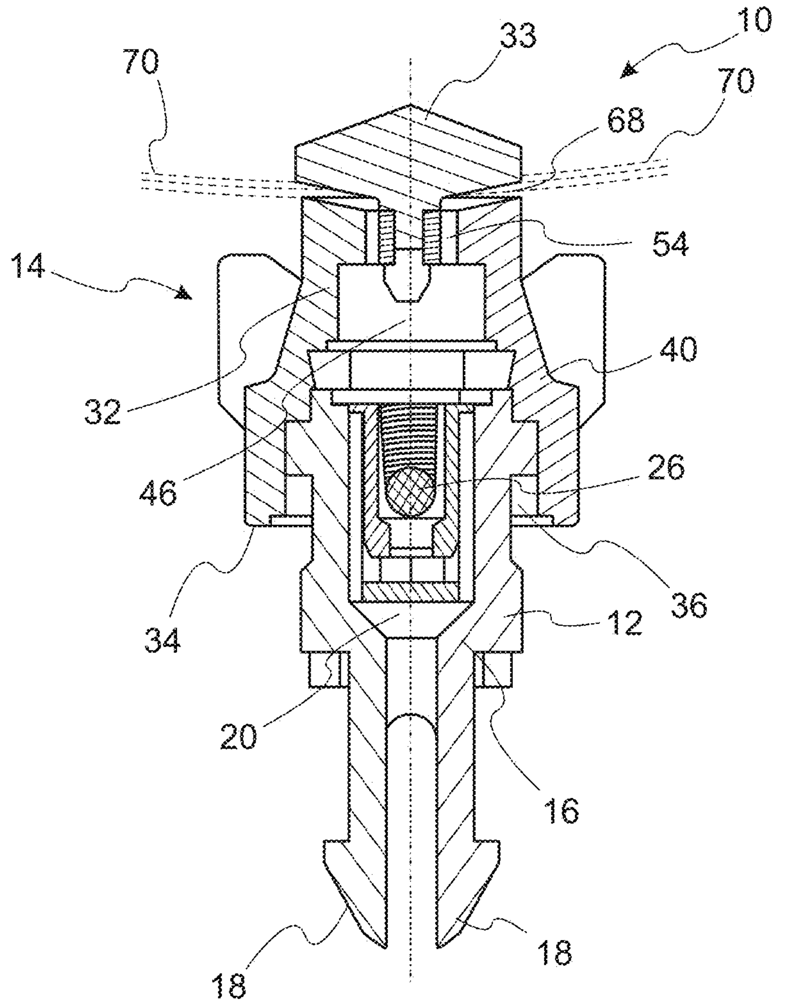
FIG. 3 is a partial side section view of the spray nozzle assembly of FIG. 1.
Figure 7:
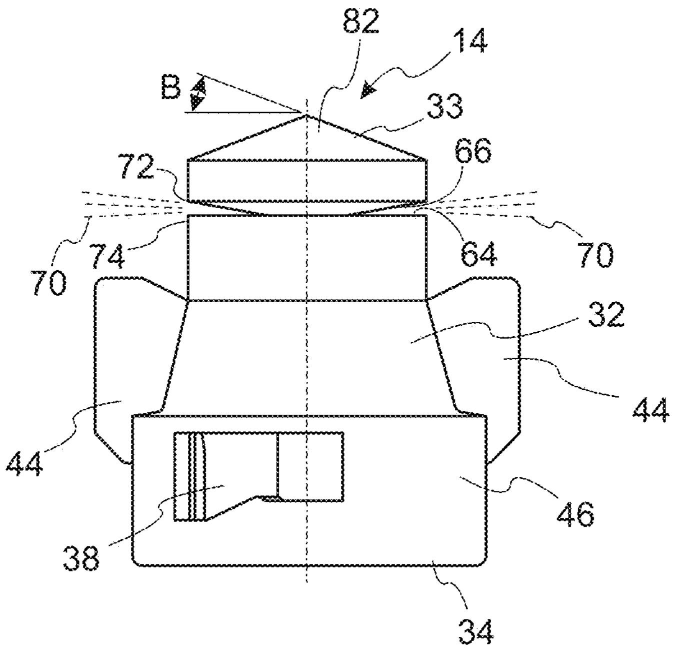
FIG. 7 is a side elevation view of the nozzle cap sub-assembly of the spray nozzle assembly of FIG. 1.
Figure 8:
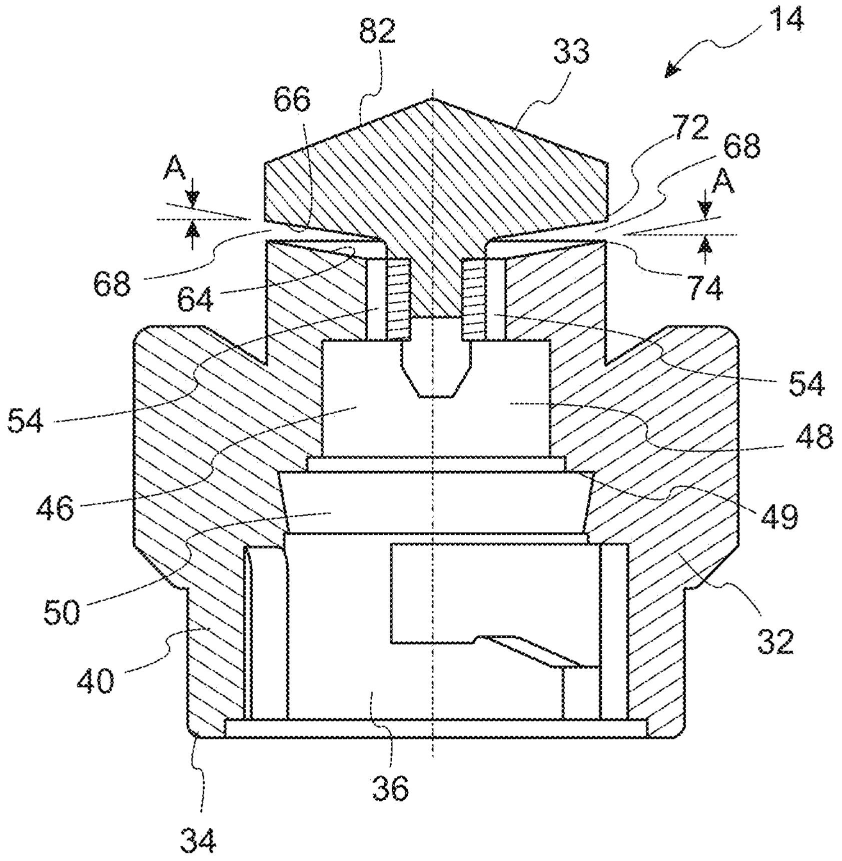
FIG. 8 is a side section view of the nozzle cap sub-assembly of FIG. 7.

As noted previously, the nozzle cap sub-assembly 14 is, in this case attached to the downstream outlet end 24 of the nozzle body 12 as shown in FIG. 4. In the illustrated embodiment, as best shown in FIGS. 7 and 8, the nozzle cap subassembly generally includes a cap body 32 and a deflector cap 33. The cap body 32 has a generally cylindrical configuration that has an upstream end portion 34 configured for detachable connection to the nozzle body 12. In particular, the upstream end portion 34 of the cap body 32 includes an internal recess 36 (see FIG. 8) that can be positioned over the downstream outlet end 24 of the nozzle body 12 such as shown in FIGS. 3 and 4. In this case, one or more windows 38 are provided in a sidewall 40 of the upstream end portion 34 of the cap body 32 (see FIG. 7) that can engage with one or more complementary tabs 42 (see FIG. 5) on the exterior surface of the nozzle body 12 to provide a quarter-turn type connection between the cap body 32 and the nozzle body 12 when the cap body is position over the downstream outlet end 24 of the nozzle body 12. In the illustrated embodiment, wings 44 are provided on the exterior surface of the cap body 32 to help a user grasp and turn the cap body 32 when securing it to the nozzle body 12. In an alternative embodiment, the cap body 32 and nozzle body 12 may be configured to provide a threaded connection therebetween. According to one embodiment, the cap body 32 is made of plastic, such as, for example, polypropylene. However, the nozzle body 32 can be made of any suitable material including, for example, metal.

For directing fluid through the cap body 32, a second fluid passage 46 (see FIG. 8) is provided in the cap body 32 that communicates with the first fluid passage 20 in the nozzle body 12 when the cap body 32 and nozzle body 12 are interconnected. In the illustrated embodiment, the second fluid passage 46 in the cap body 12 has an upstream section 48 that terminates in an annular shoulder 49 and is adapted to receive the second gasket 30 as shown in FIG. 3. The second gasket 30 is sized so that, when the second gasket 30 is installed, the upstream section 48 of the second fluid passage 46 in the cap body 32 has a diameter that approximates the diameter of the first fluid passage 20 in the nozzle body 12. The second fluid passage 46 further includes a downstream section 50 that, in this case, has a larger diameter than the passage through the second gasket 30. It should be understood that the configuration of the second fluid passage 46 through the cap body 32 is not limited to that shown in the drawings and that other configurations may also be used.

Figure 9:
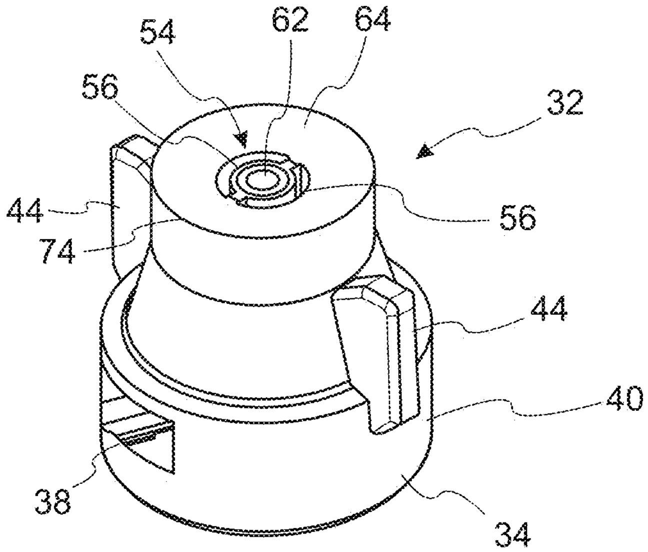
FIG. 9 is a top perspective view of the cap body of the spray nozzle assembly of FIG. 1.
Figure 10:
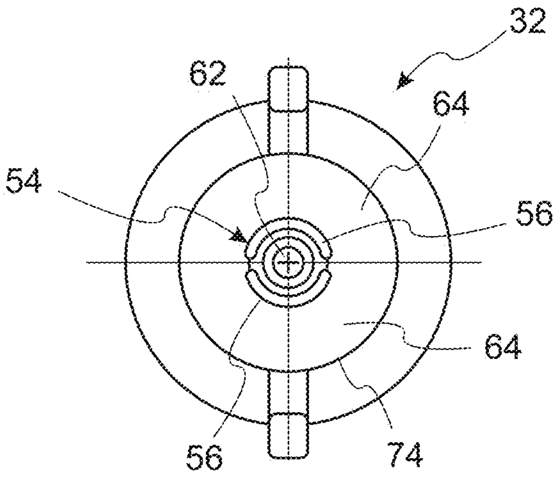
FIG. 10 is a top view of the cap body of FIG. 9.
Figure 11:
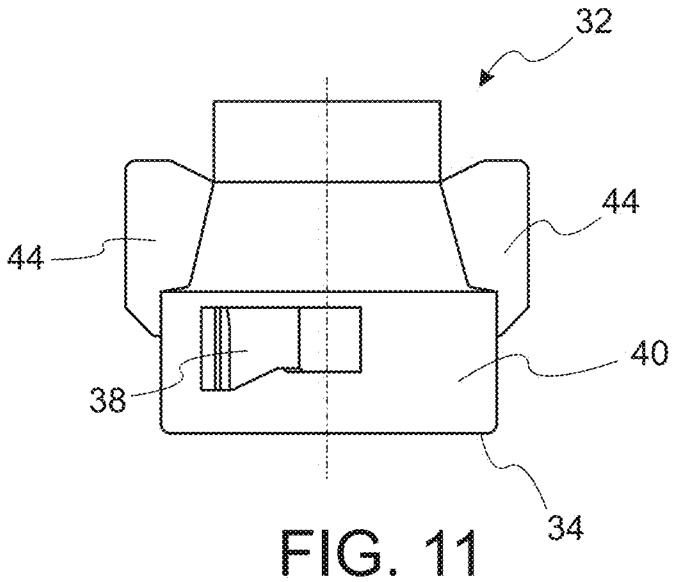
FIG. 11 is a side elevation view of the cap body of FIG. 9.
Figure 12:
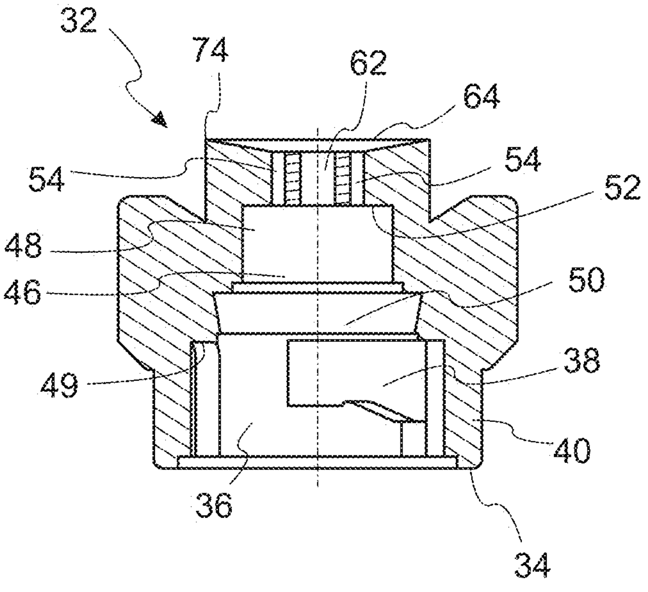
FIG. 12 is a side section view of the cap body of FIG. 9.

As shown for example in FIG. 8, the second fluid passage 46 in the cap body 32 terminates in an end wall 52 in which a discharge orifice 54 is formed. In the illustrated embodiment, as shown in FIGS. 9 and 10, the discharge orifice 54 comprises a plurality (in this case, two) of concentric arc-shaped (when viewed in the longitudinal direction of the spray nozzle assembly) segments or openings 56. The two arc-shaped openings 56 are arranged in end-to-end relation such that together the two openings 56 form an approximately ring-shaped discharge orifice 54 with only two small sections preventing a continuous ring. As will be appreciated from the following discussion, other discharge orifice configurations that, in combination with the deflector cap 33, produce a fan-shaped discharge pattern may be used.

For deflecting the fluid that exits the cap body 32 via the discharge orifice 54, the deflector cap 33 is provided on the downstream end of the cap body 32 opposite the discharge orifice 54 as shown in FIG. 8. In this case, the deflector cap 33 includes a stem portion 60 (see, e.g., FIG. 13, that extends from a lower or upstream side of the deflector cap 33 that faces an exterior end surface 64 of the cap body 32. This stem portion 60 is received in a mounting opening 62 (see FIGS. 9 and 10) in the end wall 52 of the cap body 32 and is configured such that the upstream side of the deflector cap 33 is spaced a distance in the longitudinal downstream direction from the end surface 64 of the cap body 33 as shown in FIG. 8. The mounting opening 62 is concentric with the two arc-shaped openings 56 that comprise the discharge orifice 54 as shown in FIG. 10. With this arrangement, the upstream side of the deflector cap 33 defines an annular deflector surface 66 downstream of and concentric with the discharge orifice 54. In the illustrated embodiment, the deflector surface 66 and the end surface 64 of the cap body 32 extend in parallel relation to one another (see FIG. 8) although other arrangements may also be used. According to one embodiment, the deflector cap 33 is made of plastic, such as, for example, polypropylene.

The deflector surface 66 combined with the outer end surface 64 of the cap body 32 define a radially outwardly extending, annular discharge passage 68 that fans out the fluid exiting the cap body 32 through the discharge orifice 54 (as shown in FIG. 3) into a full 360° hollow cone spray pattern 70. This arrangement and configuration of the discharge passage 68 takes advantage of low pressure regions on the upstream and downstream sides of the discharge passage 68 to optimize the distance of the induced flow produced by the spray nozzle assembly 10 in the fluid medium as well as to facilitate mixing of the fluid medium including any particles present therein. The size of the gap in the longitudinal direction between the deflector surface 66 and the end surface 64 of the cap body 32 influences the velocity of the fluid exiting the discharge passage 68 with smaller gaps generally resulting in higher fluid exit velocities. As shown in FIGS. 7 and 8, the discharge passage 68 terminates at the respective outer edges 72, 74 of the deflector surface 66 and the end surface 64 of the cap body 32. In the illustrated embodiment, these outer edges 72, 74 are parallel to each other. Moreover, the outer edges 72, 74 are both centered on the longitudinal axis of the spray nozzle assembly 10 and are the same radial distance from the longitudinal axis of the spray nozzle assembly 10. In order to produce a good, consistent spray pattern 70, in some embodiments, it is desirable that the respective outer edges 72, 74 of the deflector surface 66 and the end surface 64 of the cap body 32 be sharp, non-rounded edges.

In the illustrated embodiment, the end surface 64 of the cap body 32 and the deflector surface 66 of the deflector cap 33 are both angled in the downstream direction as the surfaces extend radially outward from the discharge orifice 54 as shown in FIG. 8. According to one embodiment, the end surface 64 of the cap body 32 and the deflector surface 66 each extend at an angle A (see FIG. 8) of approximately 10° in the downstream direction relative to a plane extending in perpendicular relation to the longitudinal axis of the spray nozzle assembly 10. However, the end surface 64 of the cap body 32 and the deflector surface 66 need not be angled in the downstream direction as they extend radially outward and instead both may extend in perpendicular relation to the longitudinal axis of the spray nozzle assembly 10. If a non-perpendicular angle is used, the angles A formed by the end surface of the cap body and the deflector surface as they extend radially outward may be, for example, between approximately 60° in the upstream direction and approximately 80° in the downstream direction as measured relative to a plane perpendicular to the longitudinal axis of the spray nozzle assembly 10. The angle A used for the deflector surface and the end surface of the cap body will depend on the particular application in which the spray nozzle assembly will be used.

Figure 14:
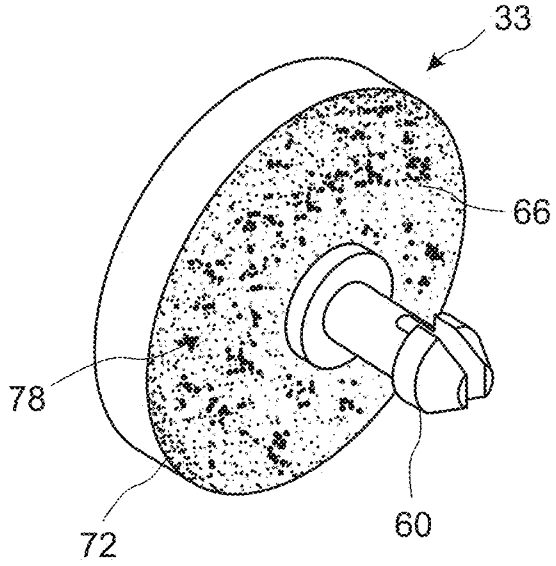
FIG. 14 is a bottom perspective view of the deflector cap of FIG. 13.
Figure 15:
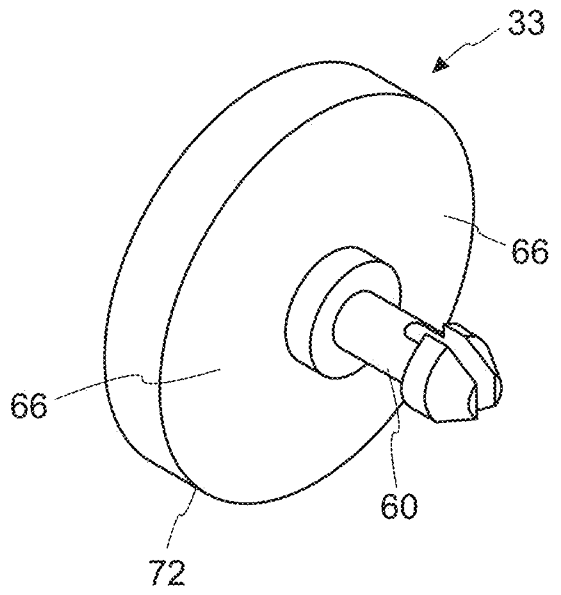
FIG. 15 is a bottom perspective view of an alternative embodiment of the deflector cap.

In order to further influence the discharging spray characteristics including the fluid exit velocity and droplet formation and droplet size of the discharging fluid, the deflector surface 66 and/or the end surface 64 of the cap body 32 may have a non-smooth surface finish. For example, as shown in FIG. 14, the deflector surface 66 may have a rough textural surface finish 78. A similar rough textural surface finish 78 to that shown in FIG. 14 may be provided on the end surface 64 of the cap body 32 in addition to or as an alternative to the deflector surface 66. A rough surface finish 78 such as shown in FIG. 14 has been found to help produce a spray pattern whose exit velocity and droplet size is such that a desired discharging spray pattern is maintained despite the spray nozzle assembly 10 being immersed in a fluid environment. The rough surface finish 78 on the deflector surface 66 and/or end surface 64 can help ensure that a desirable spray pattern is produced even when the fluid being discharged and the fluid medium in which the nozzle is submerged are of the same or similar densities. It has further been found that with some fluid discharge angles, smooth surface finishes on the deflector surface and the end surface of the cap body can produce a situation where no droplets are formed in the discharging fluid.

Figure 16:
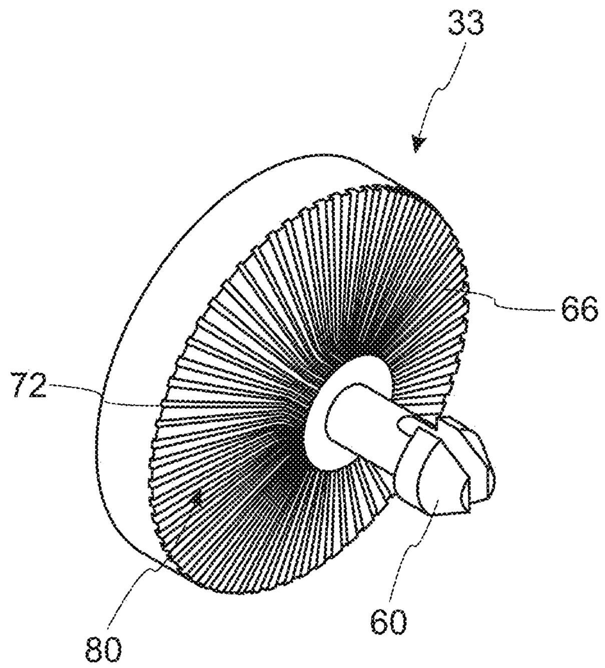
FIG. 16 is a bottom perspective view of a further alternative embodiment of the deflector cap.
Figure 17:
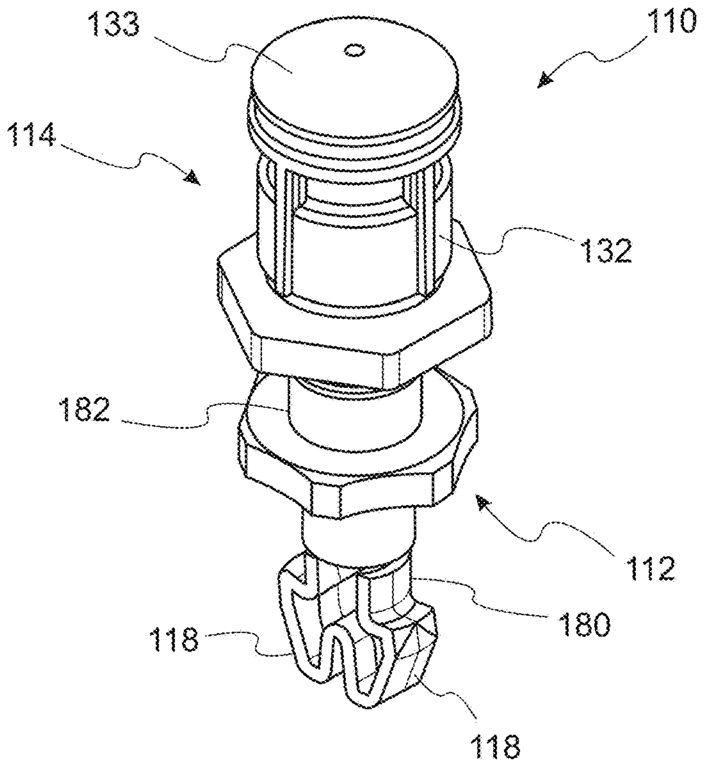
FIG. 17 is a top perspective view of a further exemplary embodiment of a spray nozzle assembly according to the present invention
Figure 18:
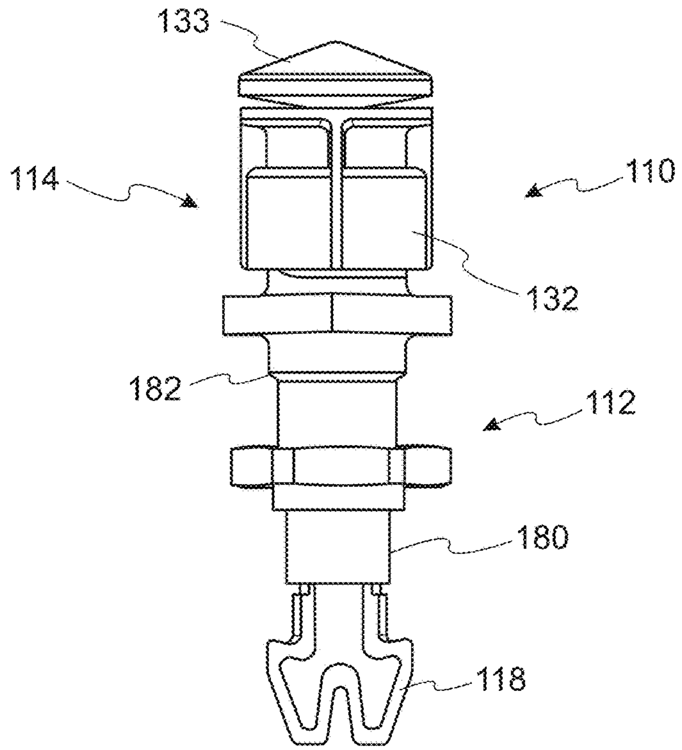
FIG. 18 is a side elevation view of the spray nozzle assembly of FIG. 17.
Figure 19:
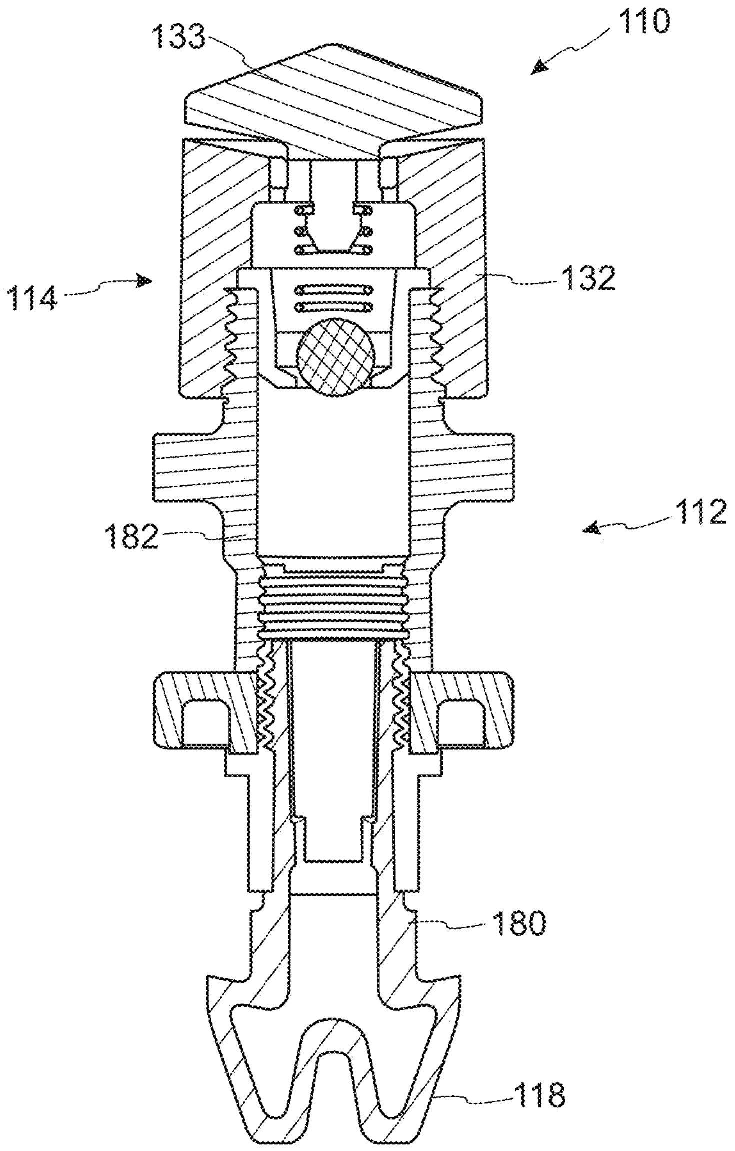
FIG. 19 is a partial side section view of the spray nozzle assembly of FIG. 17.
Figure 20:
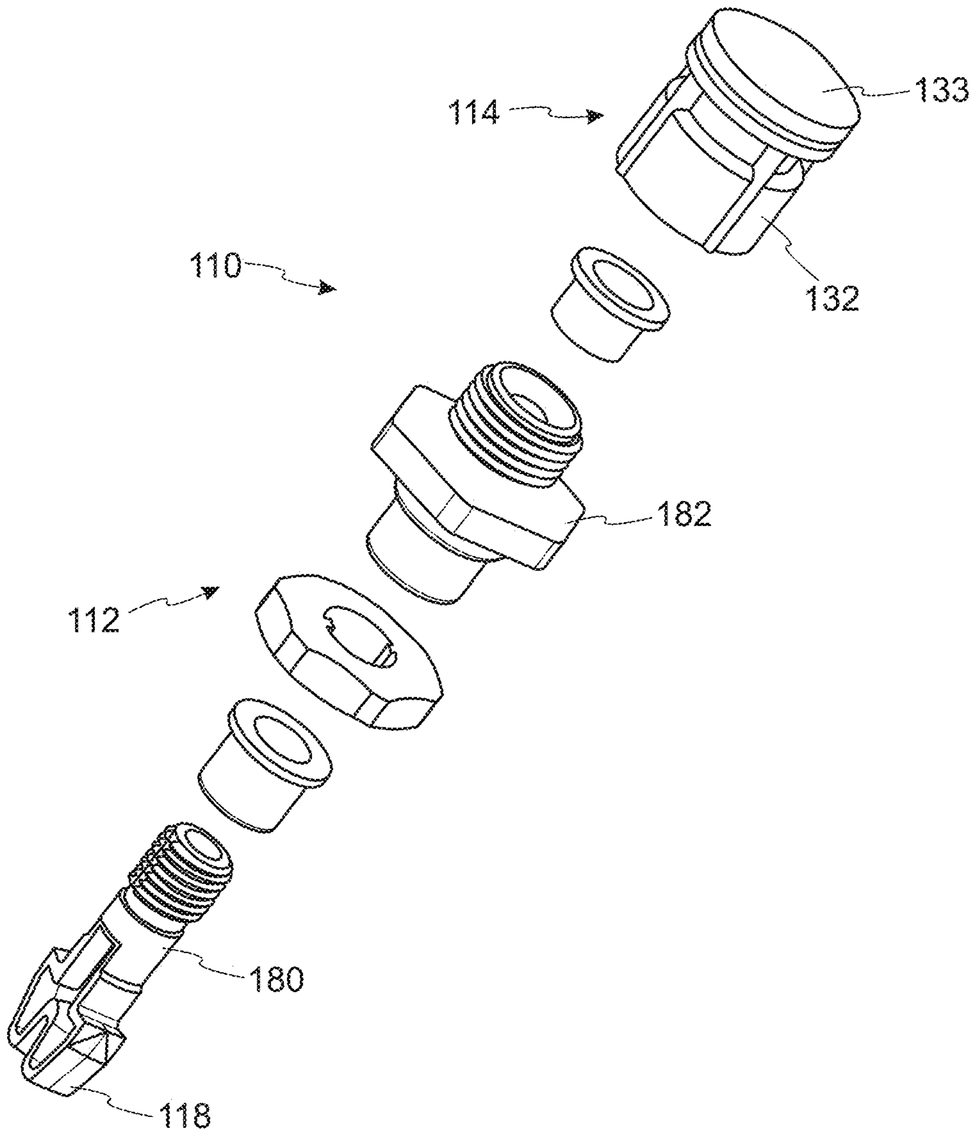
FIG. 20 is an exploded perspective view of the spray nozzle assembly of FIG. 17.

According to another embodiment such as shown in FIG. 16, the surface finish may comprise a radially extending pattern of ridges and grooves 80 that extend outwards from the center of the deflector surface 66. As is the case with the embodiment of FIG. 14, the radially extending ridge and groove surface finish 80 may be provided on either the deflector surface 66, the end surface 64 of the cap body 32 or both. It has been found that the radially extending pattern of ridges and grooves 80 helps produce increased fluid exit velocity as compared to a deflector surface and/or an end surface of the cap body having a substantially smooth surface.

Figure 13:
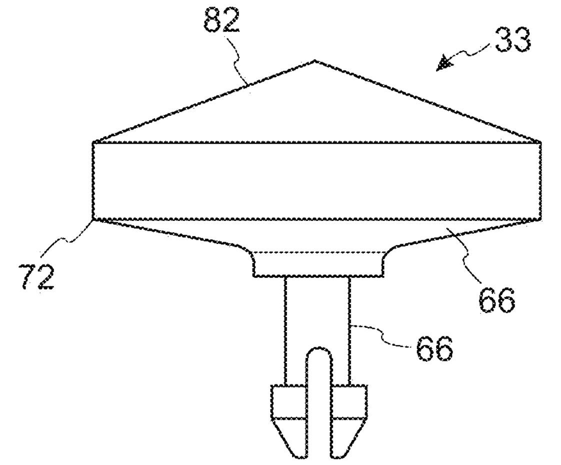
FIG. 13 is a side elevation view of the deflector cap of the spray nozzle assembly of FIG. 1.

To deflect surrounding fluid flows in the fluid medium away from the discharge passage 68 of the spray nozzle assembly 10 and thereby facilitate entrainment of the fluid being discharged therefrom, the downstream end surface 82 of the deflector cap 33 may have a conical configuration as shown for example in FIGS. 7 and 13. This conical configuration of the deflector cap 33 can also help prevent any particles present in the fluid medium from building up on the downstream end surface 82. According to one embodiment, the angle B (see FIG. 7) between a plane perpendicular to the longitudinal axis of the spray nozzle and the downstream end surface 82 of the deflector cap 33 may be between approximately 10° and approximately 80°. In one particular embodiment, the angle B is approximately 20°.

A further embodiment of a spray nozzle assembly 110 according to the present disclosure is shown in FIGS. 17-20. The embodiment of FIGS. 17-20 operates and produces flow characteristics substantially the same as the spray nozzle assembly of FIGS. 1-16. The only significant difference between the embodiments relates to how the spray nozzle assembly 110 is installed. Like the embodiment of FIGS. 1-16, the spray nozzle assembly 110 includes a nozzle body 112 and a nozzle cap subassembly 114 that includes a cap body 132 and a deflector cap 133. The cap body 132 and deflector cap 133 together define a radially outwardly extending, annular discharge passage 168 that produces a full 360° hollow cone spray pattern. The nozzle body 112 includes a pair of deflectable legs 118 that facilitate connection with a conduit or other fluid supply. In this case, the deflectable legs are part of a lower stem portion 180 of the nozzle body 120 that is separable from an upper portion 182 of the nozzle body 120. More specifically, the lower stem portion 180 and the upper portion 182 of the nozzle body 120 engage via a set of external threads on the lower stem portion 180 that engage with complementary internal threads in an upstream recess of the nozzle body 120 (see FIGS. 19 and 20). Similarly, the nozzle cap subassembly 114 attaches to the nozzle body 120 via threads, which in the illustrated embodiment (also shown in FIGS. 19 and 20) consist of external threads on the exterior of the upper or downstream end of the upper portion 182 of the nozzle body 120, and internal threads in the upstream end portion 134 of the nozzle cap subassembly 114. While various methods are shown in relation to the attachment of the spray nozzle assembly to a conduit and the nozzle body and nozzle cap subassembly 114 to each other, the present invention is not limited to any discloses connection method.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B”) is to be construed to mean one item selected from the listed items (A or B) or any combination of two or more of the listed items (A and B), unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A spray nozzle assembly for injecting a fluid into a fluid medium with the spray nozzle assembly being submerged in the fluid medium, the spray nozzle assembly comprising:

a nozzle cap body having an internal fluid passage, the internal fluid passage having an upstream end and a downstream end, the downstream end of the internal fluid passage being defined by an end wall having a discharge orifice, the end wall defining an exterior end surface of the nozzle cap body; and a deflector cap arranged at a downstream end of the nozzle cap body, the deflector cap having a first end defining a deflector surface spaced from the exterior end surface of the nozzle cap body in a longitudinal direction of the spray nozzle assembly and opposing the discharge orifice;

wherein the exterior end surface of the nozzle cap body and the deflector surface define a radially outwardly extending, annular discharge passage communicating with the discharge orifice and that together with the discharge orifice produces a full hollow cone spray discharge pattern;

wherein the deflector cap has a second end surface opposite the deflector surface, the second end surface defining an external end surface of the spray nozzle assembly and having a conical configuration.

2. The spray nozzle assembly of claim 1, wherein at least one of the deflector surface of the deflector cap and the exterior end surface of the nozzle cap body has a surface finish with a plurality of ridges and/or grooves.

3. The spray nozzle assembly of claim 2, wherein the non-smooth surface finish comprises radially extending grooves.

4. The spray nozzle assembly of claim 1, wherein the deflector surface and the exterior end surface of the nozzle cap body have respective outer edges that are sharp, non-rounded edges.

5. The spray nozzle assembly of claim 1, wherein the conical configuration of the second end surface of the deflector cap defines an angle between approximately 10° and approximately 80° with a plane perpendicular to a longitudinal axis of the spray nozzle assembly.

6. The spray nozzle assembly of claim 1, wherein the exterior end surface of the nozzle cap body and the deflector surface each extend in a downstream direction as each extends radially outward from the discharge orifice.

7. The spray nozzle assembly of claim 1, wherein the exterior end surface of the nozzle cap body and the deflector surface each extend at an angle of between approximately 60° in an upstream direction and 80° in a downstream direction relative to a plane perpendicular to a longitudinal axis of the spray nozzle assembly.

8. The spray nozzle assembly of claim 1, wherein the deflector surface and the exterior end surface of the nozzle cap body have respective outer edges that are centered on a longitudinal axis of the spray nozzle assembly with the respective outer edges being spaced an equal radial distance from the longitudinal axis of the spray nozzle assembly.

9. The spray nozzle assembly of claim 1, wherein the discharge orifice comprises a plurality of concentric, arc-shaped segments.

10. The spray nozzle assembly of claim 1, further including a nozzle body having an upstream end and a downstream end, the upstream end of the nozzle body including a fluid inlet and the downstream end of the nozzle body including a fluid outlet that communicates with the internal fluid passage in the nozzle cap body.

11. The spray nozzle assembly of claim 1, wherein the nozzle cap body is detachably connectable to a nozzle body.

12. The spray nozzle assembly of claim 1, wherein the deflector cap includes a stem portion that is received in the end wall of the nozzle cap body.

13. The spray nozzle assembly of claim 1, wherein the exterior end surface of the nozzle cap body and the defector surface extend substantially parallel to each other.

* * * * *